United States Patent
Begen

(10) Patent No.: US 10,339,280 B1
(45) Date of Patent: *Jul. 2, 2019

(54) SYSTEMS AND METHODS FOR PROTECTING CONTENT WHEN USING A GENERAL PURPOSE USER INTERFACE APPLICATION

(71) Applicant: Stamps.com Inc., El Segundo, CA (US)

(72) Inventor: Geoffrey C. Begen, Lake Forest, CA (US)

(73) Assignee: Stamps.com Inc., El Segundo, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 15/630,849

(22) Filed: Jun. 22, 2017

Related U.S. Application Data

(63) Continuation of application No. 12/103,465, filed on Apr. 15, 2008, now Pat. No. 9,728,107.

(51) Int. Cl.
*G06F 21/10* (2013.01)
*H04L 29/06* (2006.01)

(52) U.S. Cl.
CPC .......... *G06F 21/10* (2013.01); *H04L 63/0245* (2013.01); *H04L 63/168* (2013.01)

(58) Field of Classification Search
CPC ....................................................... G06F 21/10
See application file for complete search history.

(56) References Cited

U.S. PATENT DOCUMENTS

| 4,325,440 A | 4/1982 | Crowley et al. |
| 4,535,419 A | 8/1985 | Dlugos et al. |

(Continued)

FOREIGN PATENT DOCUMENTS

| EP | 1916628 A1 | 4/2008 |
| WO | WO-2008/049580 A1 | 5/2008 |

OTHER PUBLICATIONS

Karjoth; Access control with IBM Tivoli access manager; Published in: Journal ACM Transactions on Information and System Security (TISSEC) TISSEC Homepage archive; vol. 6 Issue 2, May 2003; pp. 232-257; ACM Digital Library (Year: 2003).*

(Continued)

*Primary Examiner* — Bradley W Holder
(74) *Attorney, Agent, or Firm* — Norton Rose Fulbright US LLP

(57) ABSTRACT

Systems and methods which prevent or limit access to protected content (e.g., value bearing indicia (VBI)) by a general purpose user interface application (e.g., web browser) are shown. Embodiments implement techniques to avoid displaying protected content by a general purpose user interface application, or displaying protected content during a time in which a user does not have access to particular functions of the general purpose user interface application, to protect the content from various operations, such as repeated printing, electronic copying, etc. Data presentation formatting control in the form of style sheets may be utilized to control access to content. Additionally or alternatively, executable code or an executable object may be implemented within a page or other content to control access to content. Similarly, separate areas, such as windows or pages, may be utilized to control access to content.

17 Claims, 2 Drawing Sheets

(56) References Cited

U.S. PATENT DOCUMENTS

| | | | |
|---|---|---|---|
| 4,595,984 A | 6/1986 | Daniels | |
| 4,739,486 A | 4/1988 | Soderberg et al. | |
| 4,725,718 A | 5/1988 | Sansone et al. | |
| 4,831,555 A | 5/1989 | Sansone et al. | |
| 4,839,813 A | 6/1989 | Hills et al. | |
| 5,509,109 A | 4/1996 | Kim et al. | |
| 5,606,507 A | 2/1997 | Kara | |
| 5,629,980 A | 5/1997 | Stefik et al. | |
| 5,636,292 A | 6/1997 | Rhoads | |
| 5,666,284 A | 9/1997 | Kara | |
| 5,682,318 A | 10/1997 | Kara | |
| 5,717,597 A | 2/1998 | Kara | |
| 5,737,426 A | 4/1998 | Brookner et al. | |
| 5,774,886 A | 6/1998 | Kara | |
| 5,778,076 A | 7/1998 | Kara et al. | |
| 5,787,406 A | 7/1998 | Arsenault et al. | |
| 5,796,834 A | 8/1998 | Whitney et al. | |
| 5,801,364 A | 9/1998 | Kara et al. | |
| 5,801,944 A | 9/1998 | Kara | |
| 5,812,991 A | 9/1998 | Kara | |
| 5,819,240 A | 10/1998 | Kara | |
| 5,822,739 A | 10/1998 | Kara | |
| 5,982,506 A | 11/1999 | Kara | |
| 5,983,209 A | 11/1999 | Kara | |
| 5,988,897 A | 11/1999 | Pierce et al. | |
| 5,999,967 A | 12/1999 | Sundsted | |
| 6,157,919 A | 12/2000 | Cordery et al. | |
| 6,158,003 A | 12/2000 | Kara | |
| 6,199,055 B1 | 3/2001 | Kara et al. | |
| 6,208,980 B1 | 3/2001 | Kara | |
| 6,233,565 B1 | 5/2001 | Lewis et al. | |
| 6,233,568 B1 | 5/2001 | Kara | |
| 6,244,763 B1 | 6/2001 | Miller | |
| 6,249,777 B1 | 6/2001 | Kara et al. | |
| 6,428,219 B1 | 8/2002 | Stier et al. | |
| 6,470,327 B1 | 10/2002 | Carroll et al. | |
| 6,585,778 B1 | 7/2003 | Hind et al. | |
| 6,619,544 B2 | 9/2003 | Bator et al. | |
| 6,671,813 B2 | 12/2003 | Ananda | |
| 6,680,783 B1 | 1/2004 | Pierce et al. | |
| 7,149,726 B1 | 12/2006 | Lingle et al. | |
| 7,180,616 B2 | 2/2007 | Miyoshi et al. | |
| 7,190,467 B2 | 3/2007 | Simpson et al. | |
| 7,200,858 B1 | 4/2007 | Benjamin et al. | |
| 7,216,110 B1* | 5/2007 | Ogg | G06Q 20/382 400/401 |
| 7,236,956 B1* | 6/2007 | Ogg | G06F 21/602 705/50 |
| 7,243,842 B1 | 7/2007 | Leon et al. | |
| 7,251,632 B1 | 7/2007 | Ogg et al. | |
| 7,290,705 B1 | 11/2007 | Shin | |
| 7,315,845 B2 | 1/2008 | Elliott | |
| 7,353,213 B2 | 4/2008 | Ryan, Jr. et al. | |
| 7,383,194 B2 | 6/2008 | Heiden et al. | |
| 7,433,849 B2 | 10/2008 | Cordery et al. | |
| 7,474,762 B2 | 1/2009 | Dimeski | |
| 7,475,041 B2 | 1/2009 | Pintsov et al. | |
| 7,490,065 B1* | 2/2009 | Ogg | G06Q 20/382 705/50 |
| 7,711,650 B1 | 5/2010 | Kara | |
| 7,784,090 B2 | 8/2010 | Lord et al. | |
| 7,873,572 B2 | 1/2011 | Reardon | |
| 7,933,845 B1 | 4/2011 | Leon et al. | |
| 8,359,332 B1 | 1/2013 | Diamond et al. | |
| 8,446,621 B2 | 5/2013 | Nuggehalli et al. | |
| 8,775,331 B1 | 7/2014 | Tsuie et al. | |
| 8,965,809 B1* | 2/2015 | Begen | G06F 16/00 705/60 |
| 2001/0000359 A1 | 4/2001 | Schreiber et al. | |
| 2001/0034716 A1* | 10/2001 | Goodwin | G06Q 20/0855 705/60 |
| 2001/0039625 A1 | 11/2001 | Ananda | |
| 2001/0044783 A1 | 11/2001 | Weisberg et al. | |
| 2001/0049703 A1 | 12/2001 | Miyoshi et al. | |
| 2002/0026487 A1 | 2/2002 | Ogilvie et al. | |
| 2002/0029202 A1 | 3/2002 | Lopez | |
| 2002/0036658 A1 | 3/2002 | Carolan et al. | |
| 2002/0046182 A1 | 4/2002 | Bator et al. | |
| 2002/0069260 A1 | 6/2002 | Tagg | |
| 2002/0069365 A1 | 6/2002 | Howard et al. | |
| 2002/0116508 A1 | 8/2002 | Khan et al. | |
| 2002/0178354 A1 | 11/2002 | Ogg et al. | |
| 2003/0028801 A1 | 2/2003 | Liberman et al. | |
| 2003/0037008 A1 | 2/2003 | Raju et al. | |
| 2003/0038965 A1 | 2/2003 | Simpson et al. | |
| 2003/0078893 A1 | 4/2003 | Shah et al. | |
| 2003/0088518 A1* | 5/2003 | Kirk | G06Q 20/342 705/62 |
| 2003/0101148 A1 | 5/2003 | Montgomery et al. | |
| 2003/0167179 A1 | 9/2003 | Briley | |
| 2003/0179253 A1 | 9/2003 | Manduley | |
| 2003/0208406 A1* | 11/2003 | Okamoto | G06Q 20/02 705/18 |
| 2003/0220887 A1 | 11/2003 | Stickler et al. | |
| 2003/0233462 A1 | 12/2003 | Chien | |
| 2004/0015404 A1 | 1/2004 | McCarthy | |
| 2004/0073666 A1 | 4/2004 | Foster et al. | |
| 2004/0128257 A1* | 7/2004 | Okamoto | G06Q 10/02 705/66 |
| 2004/0128516 A1* | 7/2004 | Okamoto | G06Q 20/02 713/179 |
| 2004/0211828 A1 | 10/2004 | Wilkie | |
| 2004/0230825 A1 | 11/2004 | Shepherd et al. | |
| 2004/0243523 A1 | 12/2004 | Herbert | |
| 2005/0065892 A1 | 3/2005 | Ryan et al. | |
| 2005/0065897 A1 | 3/2005 | Ryan et al. | |
| 2005/0138469 A1 | 6/2005 | Ryan et al. | |
| 2005/0192910 A1 | 9/2005 | Auberger et al. | |
| 2005/0228760 A1 | 10/2005 | Monsen et al. | |
| 2005/0235351 A1 | 10/2005 | Seltzer et al. | |
| 2006/0072174 A1 | 4/2006 | Koike et al. | |
| 2006/0098650 A1 | 5/2006 | Beninato et al. | |
| 2006/0101121 A1 | 5/2006 | Senechalle | |
| 2006/0259964 A1 | 11/2006 | Maldonado et al. | |
| 2006/0290976 A1 | 12/2006 | Ko et al. | |
| 2007/0022059 A1 | 1/2007 | Heiden | |
| 2007/0073628 A1 | 3/2007 | Pauly et al. | |
| 2007/0124260 A1 | 5/2007 | Meyer et al. | |
| 2007/0174213 A1 | 7/2007 | Whitehouse et al. | |
| 2007/0177920 A1 | 8/2007 | Katano et al. | |
| 2007/0282753 A1 | 12/2007 | Schwartz et al. | |
| 2008/0071691 A1 | 3/2008 | Meyer et al. | |
| 2008/0092239 A1 | 4/2008 | Sitrick et al. | |
| 2008/0209533 A1 | 8/2008 | Abrams et al. | |
| 2008/0294726 A1 | 11/2008 | Sidman | |
| 2009/0125387 A1 | 5/2009 | Mak et al. | |
| 2009/0141895 A1 | 6/2009 | Anderson et al. | |
| 2009/0245521 A1 | 10/2009 | Vembu et al. | |
| 2009/0327409 A1 | 12/2009 | Mayer et al. | |
| 2010/0046029 A1 | 2/2010 | Suzuki et al. | |
| 2012/0054822 A1 | 3/2012 | Dvorak et al. | |
| 2013/0125248 A1 | 5/2013 | Whitten et al. | |

OTHER PUBLICATIONS

Lin et al.; Advances in Digital Video Content Protection; Published in: Proceedings of the IEEE (vol. 93, Issue: 1, Jan. 2005); pp. 171-183; IEEE Xplore (Year: 2005).*
English translation of WO 2008/049580 to Mayer Oct. 2007.
English translation of EP1916628 to Mayer Oct. 2006.
Merriam-Webster, "postal," 2014.
Merriam-Webster, "postage," 2014.
Merriam-Webster, "indicia," 2014.
USPS, "Information-Based Indicia Program (IBIP), Performance Criteria for Information-Based Indicia and Security Architecture for Open IBI Postage Evidencing Systems (PCIBI-O)", 2000.
<http://www.deutschepost.de/dpag?tab=1&skin=hi&check=yes&lang=de_EN&xmlFile=link>1017124_1009569; "Stampit—The license for postage printing," and "Stampit Web," pp. 2, printed May 21, 2009.

(56) References Cited

OTHER PUBLICATIONS

<http://www.adobe.com/enterprise/pdfs/ger_deutschePost.pdf>; "Deutsche Post uses Adobe solutions and the Web to enable reliable printing of pre-paid stamps for parcel delivery," pp. 2, Sep. 2005.
Wikipedia, "Franking," 2014.

\* cited by examiner

SYSTEMS AND METHODS FOR PROTECTING CONTENT WHEN USING A GENERAL PURPOSE USER INTERFACE APPLICATION

CROSS-REFERENCE TO RELATED APPLICATIONS

The present application is a continuation of U.S. patent application Ser. No. 12/103,465, titled "SYSTEMS AND METHODS FOR PROTECTING CONTENT WHEN USING A GENERAL PURPOSE USER INTERFACE APPLICATION," filed Apr. 15, 2008, the disclosure of which is hereby incorporated herein by reference in its entirety.

TECHNICAL FIELD

The invention relates generally to protecting value bearing indicia and, more particularly, to providing protection of value bearing indicia when using a general purpose user interface application.

BACKGROUND OF THE INVENTION

The ability to meter value bearing indicia (VBI) for printing in the form of postage indicia has been available for an appreciable amount of time. For example, postage meters using mechanical postage value "vaults" have been widely used in businesses throughout the world for printing postage indicia, commonly referred to as meter stamps, on an as-needed basis. In more recent years, electronic systems were developed using electronic postage value vaults to provide improved security. The evolution of such electronic systems has ultimately led to the development of postage metering systems which allow remote metering operations using communications via the public switched telephone network (PSTN), local area networks (LANs), wide area networks (WANs), and the Internet. For example, U.S. Pat. No. 6,249,777 entitled "System and Method for Remote Postage Metering," U.S. Pat. No. 6,671,813 entitled "Secure On-Line PC Postage Metering System," and U.S. Pat. No. 7,149,726 entitled "Online Value Bearing Item Printing," the disclosures of which are incorporated herein by reference, show various electronic VBI metering systems facilitating remote metering operations.

In providing remote metering operations, the electronic metering systems have typically implemented specialized metering technology both at a user's site and the site remote thereto (e.g., a centralized metering site). Even where otherwise open systems are utilized, such as personal computer (PC) platforms or other general-purpose processor based systems, specialized metering technology in the form of a postage metering application or client has generally been required. Although providing vast improvements in availability to users and intuitive, robust user interfaces, the use of such specialized metering technology tends to limit the use of such metering systems. For example, in order for a PC user to interact with a remote postage server in order to obtain and print a VBI, such as in the form of a postage indicia, the user must generally download, or otherwise install, one or more specialized software applications which are adapted for interacting with the remote postage server. Such specialized software applications have often been required in order to enforce security paradigms with respect to the obtaining and printing of value, such as in the form of the VBI.

Although the current state of technology would not prevent an embodiment wherein a general purpose user interface application, such as a web browser application (e.g., INTERNET EXPLORER available from Microsoft Corporation, NETSCAPE available from Netscape Communications, Safari available from Apple Inc., and Firefox available from Mozilla Corporation), was used with respect to remote metering operations, the general belief is that the open nature of such general purpose user interface applications is not compatible with the desired level of security. For example, general purpose user interface applications generally facilitate user freedom with respect to printing, accessing content for copying into an electronic clipboard, etc.

Such freedom with respect to general purpose user interface applications can lead to even the casual user performing unpermitted or otherwise undesired activities. For example, a user might simply select a print menu (e.g., FILE|PRINT) in order to print multiple copies of a VBI. Similarly, a user might manipulate a pointing device (e.g., mouse) in order to select and copy a VBI for pasting into another software application, such as for duplicating, modification, storing, etc.

BRIEF SUMMARY OF THE INVENTION

The present invention is directed to systems and methods which prevent or limit access to protected content (e.g., value bearing indicia (VBI)) by a general purpose user interface application to thereby provide protection with respect to this content. Embodiments of the invention implement techniques to avoid displaying protected content by a general purpose user interface application, or displaying protected content during a time in which a user does not have access to particular functions of the general purpose user interface application, (collectively referred to herein as preventing accessible display of protected content) to protect the content from various operations, such as repeated printing, electronic copying, etc. General purpose user interface applications as may be the subject of content protection provided according to embodiments of the invention may comprise web browsers, network browsers, and the like. Protected content as may be provided protection according to embodiments of the present invention may comprise postage indicia, indicia used in electronic commerce, information content (e.g., online reference material), and the like.

According to embodiments of the invention, data presentation formatting control in the form of style sheets is utilized with respect to content provided to a general purpose user interface application to control access to content. Using style sheet based formatting control, such as is available using cascading style sheet (CSS) formatting available with respect to many commercially available browser applications, content can be marked to apply to various input/output (I/O) devices. For example, using CSS formatting particular content may be marked to apply only to the display, only to the printer, or to both the display and the printer. According to embodiments, two style sheets may be utilized to provide the foregoing protection to content. A first such style sheet may be applicable with respect to the display of a sample image (e.g., sample VBI) and thus is used when displaying a page to the user, wherein the protected content (e.g., actual VBI) is marked as hidden in this style sheet. A second such style sheet may be applicable with respect to the printing of protected content and thus is used when printing a page containing protected content, wherein the sample image is marked as hidden in this style sheet. Accordingly, when a page is printed, the second style sheet causes the sample image to be hidden from the printer and the protected content to be provided to the printer and thus the printed output shows the protected content.

In the foregoing embodiment, although the protected content may be present in the content provided to the general purpose user interface application, the protected content is hidden from the user, or otherwise avoiding viewable or actionable interaction by a user, thus preventing the user from accessing the protected content, such as through copying into an electronic clipboard. Moreover, because style sheet based formatting control is implemented in protecting the content, enhanced features such as scripting language control need not be activated with respect to the general purpose user interface application, thus potentially making operation of this embodiment compatible with a large number of user systems. Likewise, because the protected content is protected from user interaction, such as by being hidden from the user, and no client/server interaction need be invoked for printing, embodiments may be utilized to provide a satisfactory user experience without the risk of confusion associated with content appearing to change during printing, impeded operation at the time of printing due to firewall issues, operation of a popup blocker, etc.

Embodiments of the invention implement executable code or an executable object within a page or other content provided to a general purpose user interface application to control access to content. According to embodiments, a client-side scripting language, such as JAVASCRIPT, VB SCRIPT, J SCRIPT, or ECMA SCRIPT, is used with respect to web page content in order to replace particular content (e.g., an image source) upon printing. For example, a web page may be built to contain a sample image (e.g., sample VBI) without protected content (e.g., an actual VBI). If the user utilizes a print control native to the general purpose user interface application (e.g., the FILE|PRINT command in a web browser), the sample image will be printed. However, according to a preferred embodiment, a link or button is included within the page itself in order to facilitate printing, or other desired activity, with respect to the protected content. For example, when such a button or link is clicked, scripting language code may replace the source (e.g., uniform resource locator (URL)) of the sample image with a source (e.g., another URL) of the protected content and invoke printing functionality (e.g., invoke a browser's native print functionality), thereby causing the protected content to be printed. After the print operation, or other desired activity, the scripting language code will preferably restore the original source back to the source of the sample image.

In the foregoing embodiment, although providing display of a sample image, such as for use in previewing a printable product, the protected content appears only briefly when printing, or performing other selected activity, thus preventing the user from accessing the protected content, such as through copying into an electronic clipboard. That is, because other functions of a general purpose user interface application are typically not available during a print operation, the user is prevented from interacting in any way with the protected content during the brief period in which it is displayed. Moreover, the protected content is only provided to the general purpose user interface application during the printing operation, thereby further providing protection with respect to this content.

According to embodiments of the invention, separate windows or pages are utilized to control access to content. According to an embodiment, a web page is built to contain a sample image (e.g., sample VBI) without protected content (e.g., an actual VBI). If the user utilizes a print control native to the general purpose user interface application (e.g., the FILE|PRINT command in a web browser), the sample image will be printed. A link or button is, however, preferably included in the page itself in order to facilitate printing, or other desired activity, with respect to the protected content. For example, when such a button or link is clicked, a new window or page (collectively referred to herein as a new area) is preferably opened. This new area will, according to embodiments, include the protected content. According to a preferred embodiment, the new area will immediately invoke printing functionality (e.g., invoke a browser's native print functionality), thereby causing the protected content to be printed, and then the new area will close.

In the foregoing embodiment, although providing display of a sample image, such as for use in previewing a printable product, the protected content appears only briefly when printing, or performing other selected activity, thus preventing the user from accessing the protected content, such as through copying into an electronic clipboard. In addition to the protected content only being provided to the general purpose user interface application during the printing operation, client/server interaction for serving up the new area is preferably invoked, thereby facilitating a higher level of monitoring and/or control with respect to the protected content.

It should be appreciated that various techniques may be used in combination according to embodiments of the invention in order to provide desired protection with respect to content. For example, style sheet based formatting control may be used in combination with executable code and/or the use of separate areas (e.g., windows or pages) in order to avoid displaying protected content as well as avoid providing such content to a general purpose user interface application only when particular functions are being performed.

Control techniques in addition to those associated with the client-side may be implemented in providing protection of content according to embodiments of the invention. For example, a combination of client-side techniques and server-side techniques may be utilized in restricting activity with respect to protected content, such as to limit printing of the protected content to one-time only. According to an embodiment, a combination of client-side scripting and server-side code is used, such that client-side scripting causes a sample image to be printed instead of protected content once the protected content has been printed once and server-side code ensures that the page with the ability to print protected content is only sent to a client general purpose user interface application once (e.g., subsequent re-loads only provide the sample image).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
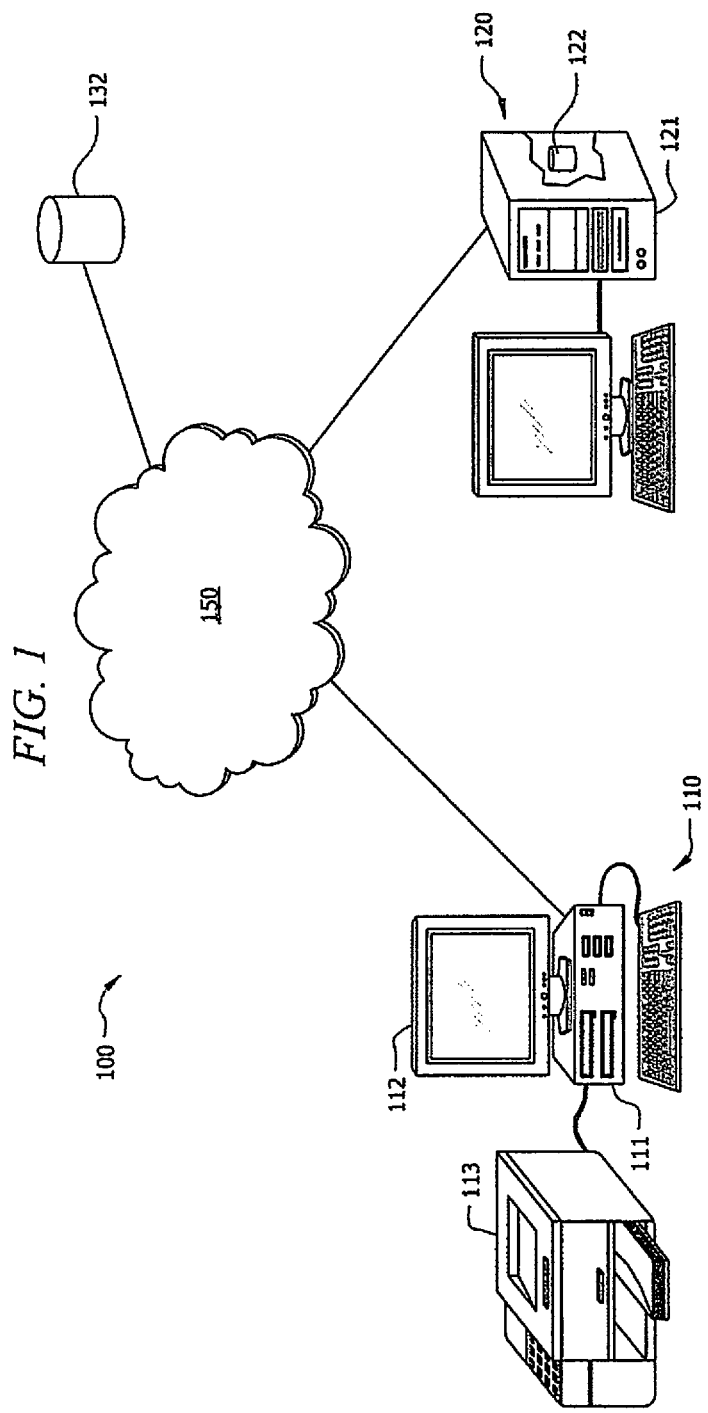
FIG. 1 shows a system adapted to provide protection of content according to an embodiment of the invention.

Directing attention to FIG. 1, system 100 adapted to prevent or limit access to protected content (e.g., value bearing indicia (VBI)) by a general purpose user interface application to thereby provide protection with respect to this content is shown. System 100 of the illustrated embodiment includes user terminal (e.g., client-side system) 110 in communication with content server (e.g., server-side system) 120 via network 150. Various systems as may provide a platform for adaptation to prevent or limit access to protected content as described herein are shown in the above referenced patents entitled "System and Method for Remote Postage Metering," "Secure On-Line PC Postage Metering System," and "Online Value Bearing Item Printing."

Network 150 provides information communication between content server 120 and user terminal 110. Network 150 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like. According to preferred embodiments multiple users operating respective user terminals may access and obtain content from content server 120.

Content server 120 preferably comprises a processor-based system, such as a computer having a central processing unit (CPU), memory, and appropriate input/output (I/O) devices and interfaces, operable under control of an instruction set defining operation as described herein. For example, content server 120 may comprise server platform 121 having a processor from the PENTIUM family of processors available from Intel Corporation, Santa Clara, Calif. Content server 120 provides storage and controlled access to various content. Accordingly, content server 120 of the illustrated embodiment comprises database 122, and/or is in communication with database 132, storing content therein.

User terminal 110 preferably comprises a processor-based system, such as computers having a CPU, memory, and appropriate I/O devices and interfaces, operable under control of instruction sets defining operation as described herein. For example, user terminal 110 may comprise computer platform 111 having a processor from the PENTIUM family of processors available from Intel Corporation, Santa Clara, Calif. User terminal 110 preferably provides output of content, protected according to embodiments of the invention, in various media under control of a general purpose user interface application (e.g., web browser, network browser, etc.). Accordingly, the illustrated embodiments of user terminal 110 includes display 112 (e.g., a cathode ray tube (CRT), liquid crystal display (LCD), plasma screen, etc.) for outputting content in a transient medium and printer 113 (e.g., an ink jet printer, a laser printer, a thermal transfer printer, a label printer, an envelope printer, etc.) for outputting content in a printed medium.

Embodiments of the present invention will be described herein with reference to protected content in the form of value bearing indicia (VBI), such as may be used with respect to postage metering applications, in order to provide examples for facilitating an understanding of the concepts of the present invention. Accordingly, content server 120 of embodiments described below may comprise a remote postage server wherein a web browser of user terminal 110 interacts with content server 120 for generating and printing postage indicia (e.g., information based indicia (IBI) utilized by the United States Postal Service (USPS)). Of course, other forms of content may be provided protection according to embodiments of the invention. For example, content provided by online reference material sites, such as SAFARI, BOOKS ONLINE, NEW YORK TIMES archives, etc., may be provided protection according to embodiments of the invention, such as to provide a print of a full chapter or article for a fee while making only excerpts available for viewing online. Likewise, different forms of general purpose user interface applications may be used according to embodiments of the present invention. Moreover, although examples are described herein with reference to protecting content for printing operations, protection of content using the concepts of the present invention may be applied to various activities and functions, such as to provide protection with respect to forwarding content from one user terminal to another user terminal.

Figure 2:
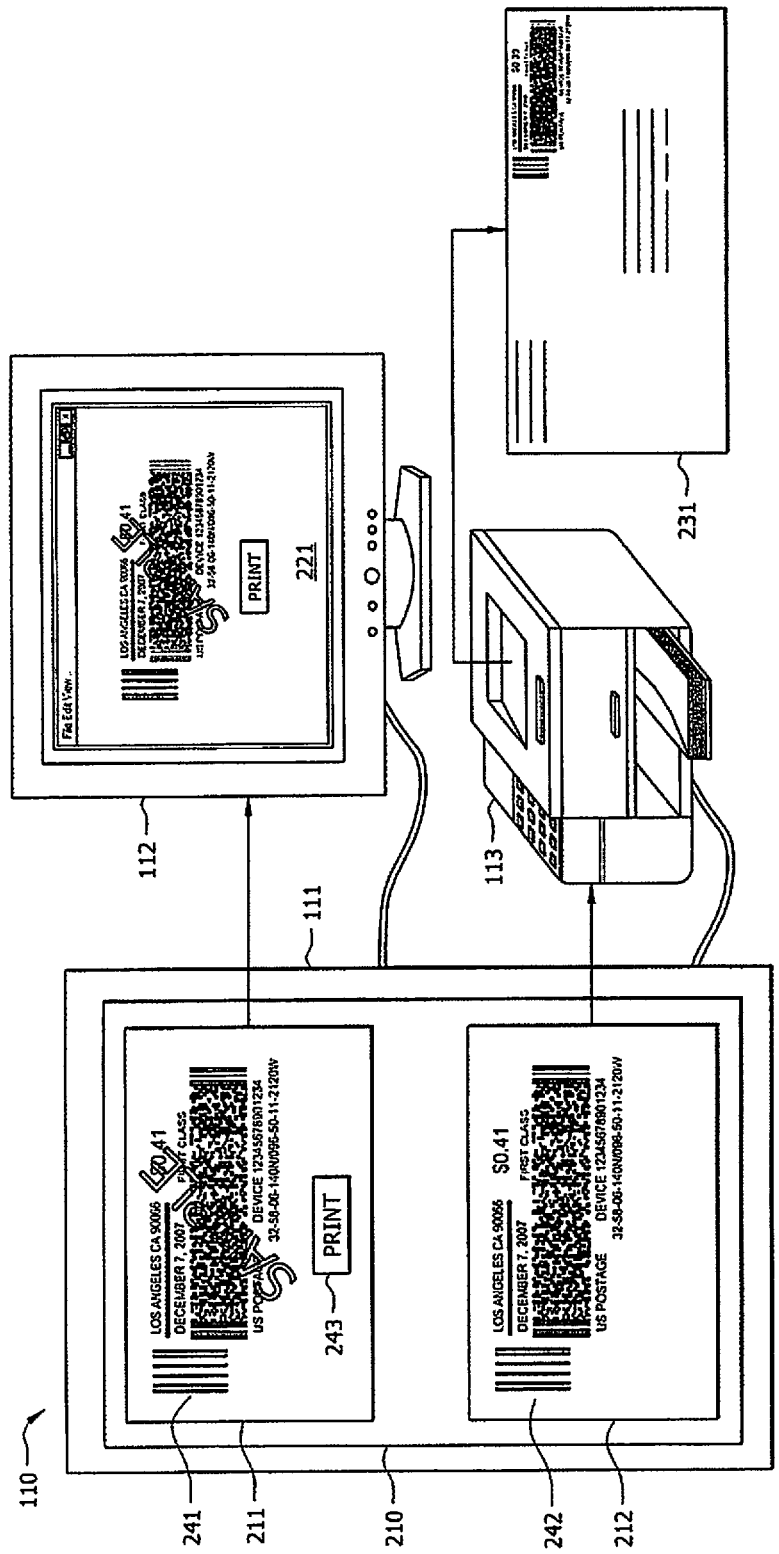
FIG. 2 shows detail with respect to unprotected and protected content according to embodiments of the invention.

According to embodiments of the invention, data presentation formatting control in the form of style sheets is utilized with respect to content provided to web browser 210 (FIG. 2) operable upon user terminal 110 to control access to content. For example, user terminal 110 operable under control of web browser 210 may interact with content server 120 to provide and obtain various content, such as may be stored in databases 122 and 132 and/or generated by content server 120, in order to print postage meter indicia on demand. The aforementioned content may comprise various web pages served to user terminal 110 by content server 120. Through such web pages user terminal 110 may provide various content, such as address information, mail item size and/or weight, postal class, delivery instructions, postage amount, account identification, user identification, etc., to content server 120. Additionally or alternatively, user terminal 110 may interact with such web pages in order to generate, obtain, and print VBI for use in a postage meter indicia. Such interaction may include providing a visual example of the postage meter indicia being created (e.g., sample VBI), perhaps accompanied with associated data such as address information, for use in visualizing the printed product prior to its having been printed. Additionally, such interaction may include providing VBI to user terminal 110 for printing, perhaps accompanied with associated data such as address information, as a postage meter indicia.

Using style sheet based formatting control, such as is available using cascading style sheet (CSS) formatting, content provided to web browser 210 of embodiments of the invention is marked to apply to various input/output (I/O) devices. For example, using CSS formatting unprotected content 211, including sample VBI 241 and other content not provided protection according to the present invention, is marked to apply only to the display while protected content 212, including actual VBI 242 and other content provided protection according to the present invention, is marked to apply only to the printer. Therefore, although content 211 and 212 may be provided to web browser 210 in a same web page, only unprotected content 211 is displayed on monitor 112 (shown as displayed content 221). Moreover, although a user views sample VBI 241 (which is not a valid VBI for use as a postage meter indicia) on display 112, actual VBI 242 of protected content 212 is printed by printer 113 (shown as printed envelope 231).

According to embodiments, two style sheets may be utilized to provide the foregoing protection to content. A first such style sheet may be applicable with respect to unprotected content 211 to provide for the display of sample VBI 241, wherein actual VBI 242 and other protected content is marked as hidden in this style sheet. A second such style sheet may be applicable with respect to protected content 212 to provide for printing of actual VBI 242, wherein sample VBI 241 and other content not to be printed is marked as hidden in this style sheet. Accordingly, when a user invokes the web browser native print function (e.g., File|Print), the second style sheet causes sample VBI 241 to be hidden from the output provided to printer 113 and actual VBI 242 is provided to printer 113. Although actual VBI 242 is present in the content of a web page provided to web browser 210, this VBI is not displayed to the user and thus opportunity for undesired activity with respect to the VBI (e.g., electronic copying into a clipboard, manipulating text or image data, etc.) is reduced.

It should be appreciated that content in addition to content for which protection according to the present invention is desired may be included with respect to output provided by the aforementioned second style sheet. For example, it may be desired to print unprotected content, such as address information, in association with a VBI. Such unprotected content may therefore be included as content applying to the printer output in the second style sheet. Content included for output by the various style sheets utilized according to the present invention may overlap. For example, the aforementioned address information may be identified for output to monitor 112 in the first style sheet and identified for output to printer 113 in the second style sheet, if desired.

Embodiments of the invention implement executable code or an executable object within a web page provided to web browser 210 to control access to content. According to an embodiment, client-side scripting language, such as JAVASCRIPT available from Sun Microsystems, is used with respect to web page content provided to web browser 210 in order to replace particular content upon printing. For example, a web page (shown as displayed content 221) may be built to contain sample VBI 241, without actual VBI 242. If the user utilizes native web browser print control (e.g., File|Print), sample VBI 241 will be provided to printer 113 for printing. In this embodiment, actual VBI 242 has not been provided to web browser 210 and thus is not available for printing by user terminal 110. However, in the illustrated embodiment executable code 243, defining a "print button" for presentation as part of displayed content 221, is provided as part of unprotected content 211. When a user actuates this print button (e.g., "clicks" the print button), executable code 243 of an embodiment replaces the source of sample VBI 241 image with a source for actual VBI 242. For example, unprotected content 211 may include a uniform resource locator (URL) identifying sample VBI 241 in database 122 and/or 132. When executable code 243 is activated, this URL may be replaced with a URL identifying actual VBI 242 in database 122 and/or 132, thereby providing protected content 212 to web browser 210.

According to a preferred embodiment, printing functionality of web browser 210 is invoked immediately upon protected content 212 being provided to web browser 210. For example, executable code 243 of a preferred embodiment invokes native print functionality of web browser 210 immediately after providing the URL identifying actual VBI 242 to web browser 210, thereby causing actual VBI 242 to be printed. After the print operation, executable code 243 preferably deletes or otherwise removes the URL identifying actual VBI 242 to web browser 210, perhaps restoring the URL of sample VBI 241, to thereby once again make actual VBI 242 unavailable to web browser 210.

The foregoing exemplary executable code results in a brief display of protected content in displayed content 221 during the printing operation. However, because other functions of web browser 210 are typically not available during such a print operation, the user is prevented from interacting in any way with actual VBI 242 during the brief period in which it is displayed. Moreover, actual VBI 242 is only provided to web browser 210 during the printing operation, thereby further providing protection with respect to this protected content. Because a source of the content is changed, rather than opening a new area, this embodiment is unlikely to experience issues with respect to firewalls and popup blocking applications.

Separate areas (e.g., windows or pages) are utilized with respect to web browser 210 to control access to content according to embodiments of the invention. A web page may be built to contain unprotected content 211, which includes sample VBI 241 without actual VBI 242, for display as displayed content 221. If the user utilizes native print control functionality of web browser 210 (e.g., the File|Print command), sample VBI 241 will be provided to printer 113 for printing. A link or button is preferably included in the page, such as by including executable code 243, in order to facilitate printing of actual VBI 242. For example, when such a button is clicked, a new area is preferably opened by accessing content of database 122 and/or 132. This new area will preferably include actual VBI 242.

The foregoing new area results in a brief display of protected content during the printing operation. However, because other functions of web browser 210 are typically not available during such a print operation, the user is prevented from interacting in any way with actual VBI 242 during the brief period in which it is displayed. In addition to actual VBI 242 only being provided to web browser 210 during the printing operation, client/server interaction for serving up the new area is preferably invoked, thereby facilitating a higher level of monitoring and/or control by content server 120 with respect to the protected content.

It should be appreciated that various techniques for protecting content may be used in combination according to embodiments of the invention. For example, style sheet based formatting control may be used in combination with executable code and/or the use of separate areas (e.g., windows or pages) in an embodiment wherein protected content is provided to the general purpose user interface application only when particular functionality is available (e.g., during a print operation), and even then operating to hide the protected content from particular media (e.g., providing the protected content for printing but not display).

The foregoing embodiments operate to provide protection to content from access, copying, manipulation, etc. by a user of the general purpose user interface application. However, a user may still attempt to perform multiple actions (e.g., printing) with respect to protected content using functionality of the general purpose user interface application and/or executable code or links provided according to embodiments of the invention. Accordingly, control techniques in addition to those associated with the client-side may be implemented in providing protection of content according to embodiments of the invention. For example, a combination of client-side techniques and server-side techniques may be utilized in restricting activity with respect to protected content, such as to limit printing of the protected content to one-time only. According to embodiments of the invention, when a button or link is selected within web browser 210 for printing actual VBI 242 (e.g., executable code 243 is initiated), access to database 122 and/or 132 to either source actual VBI 242 or open a new area including actual VBI 242 will be monitored by content server 120. According to preferred embodiments, subsequent attempts to obtain actual VBI 242 through repeated initiation of the aforementioned button or link will provide sample VBI 241 instead of VBI 242. Embodiments may allow subsequent access to actual VBI 242 in limited circumstances, such as where a misprint has occurred.

Using the foregoing techniques, general purpose user interface applications, such as web browsers in wide use today, may be utilized to access and process content, such as VBI used in postage metering applications, for which protection from unfettered copying, printing, etc. is desired. Although it may still be possible to gain access to content provided to general purpose user interface applications according to embodiments of the present invention, typical users will be prevented from readily accessing such content. Moreover, such users will be prevented from unwittingly or accidentally misusing such content, such as through accidental reprinting or copying the content without realizing that such copying is forbidden. Other mechanisms may be relied upon to prevent users determined to misuse such protected content from such misuse. For example, IBI utilized by the USPS facilitates validation of individual postage indicia, and thus may be used to prevent fraud with respect to VBI. However, such validation is typically done during after mail items have entered the mail processing stream. Although identifying invalid postage indicia, it may not be possible to identify the perpetrator or even the reason for the fraud. Accordingly, protection of content as provided herein, used in conjunction with such other protection mechanisms, provides valuable protection with respect to such content in addition to facilitating the use of general purpose user interface applications with respect to such content.

Embodiments of the present invention, or portions thereof, may be embodied in program or code segments operable upon a processor-based system (e.g., user terminal 110 and/or content server 120) for performing functions and operation as described herein. The program or code segments making up the various embodiments of the present invention may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
providing, by a server, a web page comprising content to a web browser application controlled by a user device, the content including unprotected content and executable code configured to access protected content that comprises at least one value bearing indicium, wherein said executable code is executed to access the protected content in response to a command received via the web browser application;
receiving, by the server in response to execution of the executable code, a request to obtain the protected content;
in response to receiving the request, determining whether the request to obtain the protected content is an initial request or a subsequent request to obtain the protected content, wherein the request is determined to be the subsequent request when the request is received subsequent to receiving the initial request; and
selectively providing, by the server, the protected content or the unprotected content to the web browser application based on whether the request is determined to be the initial request or the subsequent request, wherein the protected content is provided in response to a determination that the request is the initial request and the unprotected content is provided in response to a determination that the request is the subsequent request.

2. The method of claim 1, wherein the unprotected content comprises a sample value bearing indicium.

3. The method of claim 1, wherein the command corresponds to a print command received via the web browser application.

4. The method of claim 3, wherein the print command is received via a print control embedded in the web page.

5. The method of claim 4, wherein the web browser application comprises a native print control, and wherein the web page is configured to print the unprotected content in response to actuation of the native print control of the web browser application.

6. The method of claim 1, wherein the executable code comprises information that identifies a source of the protected content, and wherein the request to obtain the protected content comprises the information that identifies the source of the protected content.

7. The method of claim 6, wherein the source of the protected content comprises a uniform resource locator.

8. The method of claim 1, wherein the executable code is configured to bypass firewalls and popup blocking applications associated with the web browser application and the user device.

9. The method of claim 8, wherein the executable code bypasses the firewalls and the popup blocking applications associated with the web browser application and the user device by:
  replacing, within a portion of the web page, the unprotected content with the protected content;
  outputting the protected content to a printer device communicatively coupled to the user device after replacing the unprotected content with the protected content; and
  replacing, within the web page, the protected content with the unprotected content after the protected content is output to the printer device.

10. The method of claim 9, wherein, after replacing the unprotected content with the protected content within the portion of the web page, the protected content is displayed within the web browser application, and wherein a time duration in which the protected content is displayed within the web browser application is an amount of time needed to output the protected content to the printer device.

11. The method of claim 1, wherein the at least one value bearing indicium comprises at least one postage indicium.

12. A system comprising:
  a computer that includes:
  at least one processor configured to:
    provide a web page comprising content to a web browser application controlled by a user device, the content including unprotected content and executable code configured to access protected content that comprises at least one value bearing indicium, wherein said executable code is executed to access the protected content in response to a command received via the web browser application;
    receive a request to obtain the protected content in response to execution of the executable code;
    determine, in response to receiving the request, whether the request to obtain the protected content is an initial request or a subsequent request to obtain the protected content, wherein the request is determined to be the subsequent request when the request is received subsequent to receiving the initial request; and
    selectively provide the protected content or the unprotected content to the web browser application based on whether the request is determined to be the initial request or the subsequent request, wherein the protected content is provided in response to a determination that the request is the initial request and the unprotected content is provided in response to a determination that the request is the subsequent request; and
  a memory coupled to the at least one processor.

13. The system of claim 12, wherein the executable code is configured to:
  replace, within a portion of the web page, the unprotected content with the protected content;
  output the protected content to a printer device communicatively coupled to the user device after replacing the unprotected content with the protected content; and
  replace, within the web page, the protected content with the unprotected content after the protected content is output to the printer device.

14. A non-transitory computer-readable medium storing instructions that, when executed by one or more processors, cause the one or more processors to perform operations for printing a value bearing indicium, the operations comprising:
  providing, by a server, a web page comprising content to a web browser application controlled by a user device, the content including unprotected content and executable code configured to access protected content that comprises at least one value bearing indicium, wherein said executable code is executed to access the protected content in response to a command received via the web browser application;
  receiving, by the server in response to execution of the executable code, a request to obtain the protected content;
  in response to receiving the request, determining whether the request to obtain the protected content is an initial request or a subsequent request to obtain the protected content, wherein the request is determined to be the subsequent request when the request is received subsequent to receiving the initial request; and
  selectively providing, by the server, the protected content or the unprotected content to the web browser application based on whether the request is determined to be the initial request or the subsequent request, wherein the protected content is provided in response to a determination that the request is the initial request and the unprotected content is provided in response to a determination that the request is the subsequent request.

15. The non-transitory computer-readable medium of claim 14, wherein the at least one value bearing indicium comprises at least one postage indicium.

16. The non-transitory computer-readable medium of claim 14, wherein the executable code is configured to:
  replace, within a portion of the web page, the unprotected content with the protected content;
  output the protected content to a printer device communicatively coupled to the user device after replacing the unprotected content with the protected content; and
  replace, within the web page, the protected content with the unprotected content after the protected content is output to the printer device.

17. The non-transitory computer-readable medium of claim 16, wherein, after replacing the unprotected content with the protected content within the portion of the web page, the protected content is displayed within the web browser application, and wherein a time duration in which the protected content is displayed within the web browser application is an amount of time needed to output the protected content to the printer device.

* * * * *